United States Patent
Wanninger et al.

(10) Patent No.: US 12,307,320 B2
(45) Date of Patent: May 20, 2025

(54) DISPENSER SYSTEM COMPRISING A DISPENSER AND A REPLACEABLE LIQUID CONTAINER

(71) Applicant: Essity Hygiene and Health Aktiebolag, Gothenburg (SE)

(72) Inventors: Dan Wanninger, Philadelphia, PA (US); Erol Searfoss, Philadelphia, PA (US); Peter Bergman, Gothenburg (SE)

(73) Assignee: ESSITY HYGIENE AND HEALTH AKTIEBOLAG, Gothenburg (SE)

(*) Notice: Subject to any disclaimer, the term of this patent is extended or adjusted under 35 U.S.C. 154(b) by 153 days.

(21) Appl. No.: 18/011,045

(22) PCT Filed: Jul. 2, 2020

(86) PCT No.: PCT/EP2020/068634
§ 371 (c)(1),
(2) Date: Dec. 16, 2022

(87) PCT Pub. No.: WO2022/002400
PCT Pub. Date: Jan. 6, 2022

(65) Prior Publication Data
US 2023/0214610 A1 Jul. 6, 2023

(51) Int. Cl.
*G06K 7/10* (2006.01)
*A47K 5/12* (2006.01)
*G06K 19/07* (2006.01)

(52) U.S. Cl.
CPC ........ *G06K 7/10366* (2013.01); *A47K 5/1202* (2013.01); *A47K 5/1217* (2013.01); *G06K 19/0723* (2013.01)

(58) Field of Classification Search
CPC ........... G06K 7/10366; G06K 19/0723; A47K 5/1202; A47K 5/1217; A47K 5/1207
See application file for complete search history.

(56) References Cited

U.S. PATENT DOCUMENTS

| 5,625,659 A | 4/1997 | Sears |
| 6,375,038 B1 | 4/2002 | Daansen et al. |

(Continued)

FOREIGN PATENT DOCUMENTS

| CN | 2490103 Y | 5/2002 |
| CN | 101861116 A | 10/2010 |

(Continued)

OTHER PUBLICATIONS

Chinese Application No. 202080101597.2; Chinese Office Action with English translation dated Mar. 15, 2023; 11 pages.

(Continued)

*Primary Examiner* — Bob Zadeh
(74) *Attorney, Agent, or Firm* — CANTOR COLBURN LLP

(57) ABSTRACT

The present disclosure relates to a dispenser system comprising a dispenser and a replaceable liquid container, wherein said liquid container has a unique identity and is provided with a transponder unit with stored identification data representing said identity; wherein a transponder reader unit for cooperating with said transponder unit is located within the dispenser and wherein the transponder reader unit is configured for communicating with an external computer unit; and wherein the dispenser system is configured for detecting the usage of said liquid container so as to indicate whether said liquid container needs to be replaced. Furthermore, the dispenser system comprises an insert module which is removably arranged in said dispenser and which is configured for accommodating a liquid container.

14 Claims, 8 Drawing Sheets

(56) References Cited

U.S. PATENT DOCUMENTS

| | | | |
|---|---|---|---|
| 7,757,567 B2 | 7/2010 | Joyce et al. | |
| 7,783,380 B2 | 8/2010 | York et al. | |
| 7,980,421 B2 * | 7/2011 | Ophardt | A47K 5/1217 |
| | | | 250/221 |
| 8,091,735 B2 | 1/2012 | Girard et al. | |
| 8,201,707 B2 | 6/2012 | Ophardt | |
| 8,240,508 B2 * | 8/2012 | Wegelin | G05B 15/02 |
| | | | 222/105 |
| 8,261,942 B2 | 9/2012 | Chen | |
| 8,783,511 B2 | 7/2014 | Snodgrass | |
| 8,905,265 B2 | 12/2014 | Muderlak et al. | |
| 8,991,649 B2 | 3/2015 | Wegelin et al. | |
| 9,443,357 B2 | 9/2016 | Archer et al. | |
| 9,580,210 B2 | 2/2017 | Wegelin et al. | |
| 9,993,120 B2 | 6/2018 | Xie | |
| 10,057,709 B2 | 8/2018 | Wegelin et al. | |
| 10,365,139 B2 | 7/2019 | Singh et al. | |
| 10,460,549 B2 | 10/2019 | Wegelin | |
| 10,464,091 B2 | 11/2019 | Ophardt | |
| 10,614,699 B2 | 4/2020 | Wegelin et al. | |
| 10,723,541 B2 | 7/2020 | Akdogan et al. | |
| 10,929,794 B2 | 2/2021 | Ghazi | |
| 10,996,690 B2 | 5/2021 | Carlson | |
| 11,118,955 B2 | 9/2021 | Wegelin | |
| 11,123,153 B2 | 9/2021 | Davis et al. | |
| 11,131,575 B2 | 9/2021 | Moore | |
| 11,181,413 B2 | 11/2021 | Kobs | |
| 11,257,350 B2 | 2/2022 | Liu et al. | |
| 11,259,671 B2 | 3/2022 | Wegelin et al. | |
| 11,272,815 B2 | 3/2022 | Rospierski et al. | |
| 11,295,271 B2 | 4/2022 | Williams et al. | |
| 11,299,386 B2 | 4/2022 | Slater et al. | |
| 2008/0283550 A1 * | 11/2008 | Nighy | F04B 43/0736 |
| | | | 222/207 |
| 2009/0195385 A1 | 8/2009 | Huang et al. | |
| 2011/0017769 A1 | 1/2011 | Ophardt | |
| 2011/0056987 A1 * | 3/2011 | Proper | A47K 5/12 |
| | | | 222/181.3 |
| 2011/0108410 A1 | 5/2011 | Ophardt | |
| 2012/0245729 A1 | 9/2012 | Wegelin et al. | |
| 2013/0282172 A1 * | 10/2013 | Chen | A47K 5/1217 |
| | | | 700/237 |
| 2015/0102056 A1 | 4/2015 | Sage-Passant | |
| 2017/0014004 A1 | 1/2017 | Bullock et al. | |
| 2017/0135530 A1 * | 5/2017 | Macleod | G01F 23/263 |
| 2019/0063980 A1 * | 2/2019 | Kobs | A47K 5/16 |
| 2019/0197466 A1 * | 6/2019 | Hand, III | G06V 20/00 |
| 2020/0327520 A1 | 10/2020 | Dyer | |
| 2021/0023577 A1 | 1/2021 | Longarte Cifrián et al. | |
| 2021/0186274 A1 | 6/2021 | Mechenbier et al. | |
| 2021/0401239 A1 | 12/2021 | Buell et al. | |
| 2023/0214610 A1 * | 7/2023 | Wanninger | G06K 7/10366 |
| | | | 222/1 |

FOREIGN PATENT DOCUMENTS

| | | |
|---|---|---|
| CN | 102858215 A | 1/2013 |
| CN | 109091048 A | 12/2018 |
| CN | 109890513 A | 6/2019 |
| CN | 106605229 B | 9/2021 |
| DE | 102018116204 A1 | 1/2020 |
| EP | 3061374 A1 | 8/2016 |
| EP | 3231339 B1 | 10/2017 |
| EP | 3241470 A1 | 11/2017 |
| GB | 2087839 | 6/1982 |
| WO | 2006102263 A2 | 9/2006 |
| WO | 2011133085 A1 | 10/2011 |
| WO | 2017070401 A1 | 4/2017 |
| WO | 2017188816 A1 | 11/2017 |
| WO | 2018080545 A1 | 5/2018 |
| WO | 2018224520 A1 | 12/2018 |
| WO | 202071998 A1 | 4/2020 |
| WO | 202138247 A1 | 3/2021 |

OTHER PUBLICATIONS

International Preliminary Report on Patentability for International Application No. PCT/EP2020/068636; International Filing Date: Jul. 2, 2020; Date of Mailing: Sep. 30, 2022; 20 pages.

International Preliminary Report on Patentability for International Application No. PCT/EP2020/068637; International Filing Date: Jul. 2, 202; Date of Mailing: Oct. 10, 2022; 18 pages.

International Search Report & Written Opinion for International Application No. PCT/EP2020/068636; International Filing Date: Jul. 2, 2020; Date of Mailing: Mar. 4, 2021; 11 pages.

International Search Report & Written Opinion for International Application No. PCT/EP2020/068637; International Filing Date: Jul. 2, 202; Date of Mailing: Mar. 5, 2021; 9 pages.

Non-Final Office Action issued in U.S. Appl. No. 18/009,733; dated Jun. 30, 2023, 24 pages.

International Search Report & Written Opinion for International Application No. PCT/EP2020/068634; International Filing Date: Jul. 2, 2020; Date of Mailing: Mar. 3, 2021; 154 pages.

Chinese Application No. 202080101594.9; Office Action with English translation dated Sep. 28, 2024; 13 pages.

Chinese Application No. 202080101590.0; Chinese Office Action with English translation dated Jan. 10, 2025; 23 pages.

* cited by examiner

DISPENSER SYSTEM COMPRISING A DISPENSER AND A REPLACEABLE LIQUID CONTAINER

CROSS REFERENCE TO RELATED APPLICATIONS

This application is a National Stage application of PCT/EP2020/068634, filed Jul. 2, 2020, which is incorporated by reference in its entirety herein.

TECHNICAL FIELD

The disclosure relates to a dispenser system comprising a dispenser and a replaceable liquid container, wherein said liquid container has a unique identity and is provided with a transponder unit with stored identification data representing said identity; wherein a transponder reader unit for cooperating with said transponder unit is located within the dispenser and wherein the transponder reader unit is configured for communicating with an external computer unit; and wherein the dispenser system is configured for detecting the usage of said liquid container so as to indicate whether said liquid container needs to be replaced.

BACKGROUND

Dispensers for liquids such as soap and similar hygiene products are well known. The general purpose of such dispensers is to contain and dispense various types of liquid. Today's dispensers are used in homes, offices, hospitals, restaurants, airports and other types of environments. Furthermore, such dispensers may be arranged for dispensing different types of liquids such as soap, sanitizers, lotions, shampoo, skin care products or other types of liquids.

Furthermore, dispenser systems of the type which contains a dispenser and a replaceable liquid container are widely used. The use of a replaceable liquid container, for example for soap, allows users to replace an empty container with a new and full container in a simple manner.

In accordance with prior art, a liquid dispenser system may comprise a dispenser with a housing which accommodates such a replaceable liquid container, which is also referred to as a "refill unit", or "refill cartridge". Such a liquid container is configured to be positioned inside a housing of the dispenser during use thereof. As the fluid is discharged from the liquid container, the remaining amount of fluid will gradually decrease. Eventually, the liquid container needs to be removed and replaced with a new one.

Furthermore, it is known to incorporate a pump unit, for example a foam pump unit, either in the replaceable liquid container or in the actual dispenser housing. Such a foam pump is previously known as such and is configured to transfer a liquid, such as for example soap, from the liquid container and discharge it out of the dispenser in the form of a foam.

A known soap dispenser has a replaceable liquid container with an integrated foam pump. Such an arrangement has certain advantages. For example, it is a more hygienic solution than other known systems, due to the fact that the liquid container is sealed. Also, it will reduce problems with liquid leaking during replacement of the replaceable liquid container and it will reduce the number of moving parts in the dispenser. Furthermore, refilling can be made in a very simple manner by replacing an empty container with a full container.

Furthermore, a dispenser system may be activated by a user by means of a suitable actuation device which can be either manual or automatic. A manual actuation device can for example be in the form of a push button or a lever which is arranged to activate a dispensing mechanism. Alternatively, an automatic actuation device can for example comprise a touch-free sensor device, such as an infrared sensor, which is configured to actuate an electric motor for operating a pump unit upon detection of the presence of a user.

Irrespective of which type of actuation device is used, the purpose of such a device is to allow a user to actuate the dispenser system so as to discharge a certain amount of the soap which is contained inside the liquid container.

Furthermore, it may be desirable to detect the usage of a dispenser system, in particular with regard to tracking the remaining contents of a replaceable liquid container. This is in order to determine when the liquid container is close to empty and for this reason should be replaced. In that regard it may be desired for the container to be used as long as possible, i.e. it should not be replaced before it is empty, or close to empty.

To that end, devices and methods are known to detect and analyze the consumption of soap in a replaceable liquid container. In particular, such systems may be provided with a detection unit for detecting the actual usage or alternatively the remaining volume of soap in the dispenser, and also for transmitting signals to an external computer unit and/or to maintenance service staff, in order to convey the need to exchange the empty container for a new one.

In many environments, such as at hospitals and airports, a large number of dispensers may be used. In order to track the usage of each individual dispenser at a particular site, it has previously been suggested to provide each individual liquid container with a wireless transponder unit having stored information which corresponds to the identity of the liquid container in question. Such a dispenser may comprise a replaceable cartridge with a transponder in the form of a communications tag, which may be in the form of a radio frequency identification ("RFID") tag. The dispenser also comprises an RFID antenna unit which is connected to a communications unit. The tag may comprise identity information which is associated with a unique cartridge and may also be used for detecting the usage of the cartridge. Furthermore, the dispenser is also arranged for communicating with an external computer server and for detecting whether maintenance is required when the cartridge is empty.

Although the type of dispenser described above constitutes a suitable option which is arranged for tracking the usage of a liquid in a replaceable liquid container, there is a desire for further improvements within the field of technology in question. For example, there may be a need to be able to use new replaceable liquid containers in dispensers of the type which are not equipped with any transponder reader unit. Also, there is a need to track the usage of a liquid container by accurately detecting a cumulative consumption of soap in a liquid container.

Consequently, there is a need for further improvements within the technical field of liquid dispenser systems.

SUMMARY

In accordance with the disclosure, there is provided a dispenser system comprising a replaceable liquid container and having a purpose of solving one or more of the drawbacks of known devices within this field.

In accordance with the disclosure, in one embodiment a dispenser system is provided that comprises a dispenser and a replaceable liquid container, wherein said liquid container has a unique identity and is provided with a transponder unit with stored identification data representing said identity; wherein a transponder reader unit for cooperating with said transponder unit is located within the dispenser and wherein the transponder reader unit is configured for communicating with an external computer unit; and wherein the dispenser system is configured for detecting the usage of said liquid container so as to indicate whether said liquid container needs to be replaced. Furthermore, the dispenser system comprises an insert module which is removably arranged in said dispenser and which is configured for accommodating a liquid container.

The embodiment described above provides an advantage in that that it can be used in order to upgrade a dispenser system which is not provided with a transponder reader unit by retrofitting the insert module in the dispenser. Also, that embodiment facilitates detection and tracking of the actual usage of a replaceable liquid container by accurately detecting a cumulative consumption of soap in said liquid container.

The embodiment of described above constitutes a hygienic, integrated system using replaceable liquid containers. Due to the fact that the container is normally sealed, the liquid container cannot be refilled or topped up when it is empty. For this reason, the system in that embodiment provides a very precise measurement of the cumulative consumption of any liquid in the container. Such a measurement can be used for generating information as to a suitable occasion for replacing a used container with a new one.

The insert module may comprise the transponder reader unit for cooperating with said transponder unit.

The dispenser may comprise the transponder reader unit for cooperating with said transponder unit.

The insert module may comprise a detection unit configured for detecting the cumulative consumption of the content of said replaceable liquid container.

The dispenser may comprise a detection unit configured for detecting the cumulative consumption of the content of said replaceable liquid container.

The detection unit may comprise a magnetometer sensor.

The detection unit may comprise an actuator which is configured for being pivotally displaced through movement of a foam pump unit in said replaceable liquid container, thereby allowing detection of the usage of the contents of the liquid container.

The actuator may comprise a geared element which meshes with a further gearwheel which is arranged in said insert module.

The transponder unit may be an RFID tag and the transponder reader unit may be an RFID reader unit.

The liquid container may comprise an integrated pump unit which is configured so that activation of said pump unit in a first direction discharges a quantity of liquid from a liquid reservoir of the liquid container.

The pump unit may be arranged to be displaced in said first direction by actuating an annular flange.

The annular flange may be arranged to be actuated by means of an actuation device which is accessible to a user.

The disclosure also relates to a liquid container suitable for use in a dispenser system as described above.

The disclosure also relates to a dispenser system as defined above.

The present disclosure also provides a method for dispensing liquid in a dispenser system that comprises a dispenser and a replaceable liquid container. The method comprises: providing said liquid container with a unique identity by means of a transponder unit having stored identification data representing said identity; providing a transponder reader unit in said dispenser; providing cooperation between said transponder reader unit and said transponder unit; providing communication between said transponder reader unit and an external computer unit; and configuring said dispenser system for detecting the usage of said liquid container so as to indicate whether said liquid container needs to be replaced. Furthermore, the method comprises: configuring an insert module so as to be removably arranged in said dispenser; and configuring said insert module for accommodating a liquid container.

Further advantages and advantageous features of the embodiments contemplated herein are disclosed in the following description and in the dependent claims.

In the following, the term "dispenser system" is used to indicate an apparatus comprising at least a dispenser and a liquid container. More precisely, as will be described below, the dispenser system is configured so that it may or may not include an insert module which as such is configured for accommodating the liquid container.

In the following, the term "replaceable liquid container" is used to indicate a container for a liquid such as for example soap and which is configured so as to be easily removed from the dispenser when it is empty, thereby allowing replacement with a new liquid container.

In the following, the term "transponder" is used to indicate an electronic device which is configured for receiving an incoming signal and for emitting a response signal in response to the incoming signal. A transponder can be either an active or passive RFID tag or some other form of transponder such as a tag or label based for example on Bluetooth or biometric technology, or similar.

In the following, the term "transponder reader unit" is used to indicate an electronic device which is configured for cooperating with one or more transponders in a manner so that data stored on said transponders can be read.

BRIEF DESCRIPTION OF THE FIGURES

The disclosure will be described in greater detail below with reference to the figures shown in the appended drawings.

DETAILED DESCRIPTION OF PARTICULAR EMBODIMENTS

Different aspects of the present disclosure will be described more fully hereinafter with reference to the enclosed drawings. The disclosure can be realized in many different forms and should not be construed as being limited to the embodiments below.

Figures 1, 2:
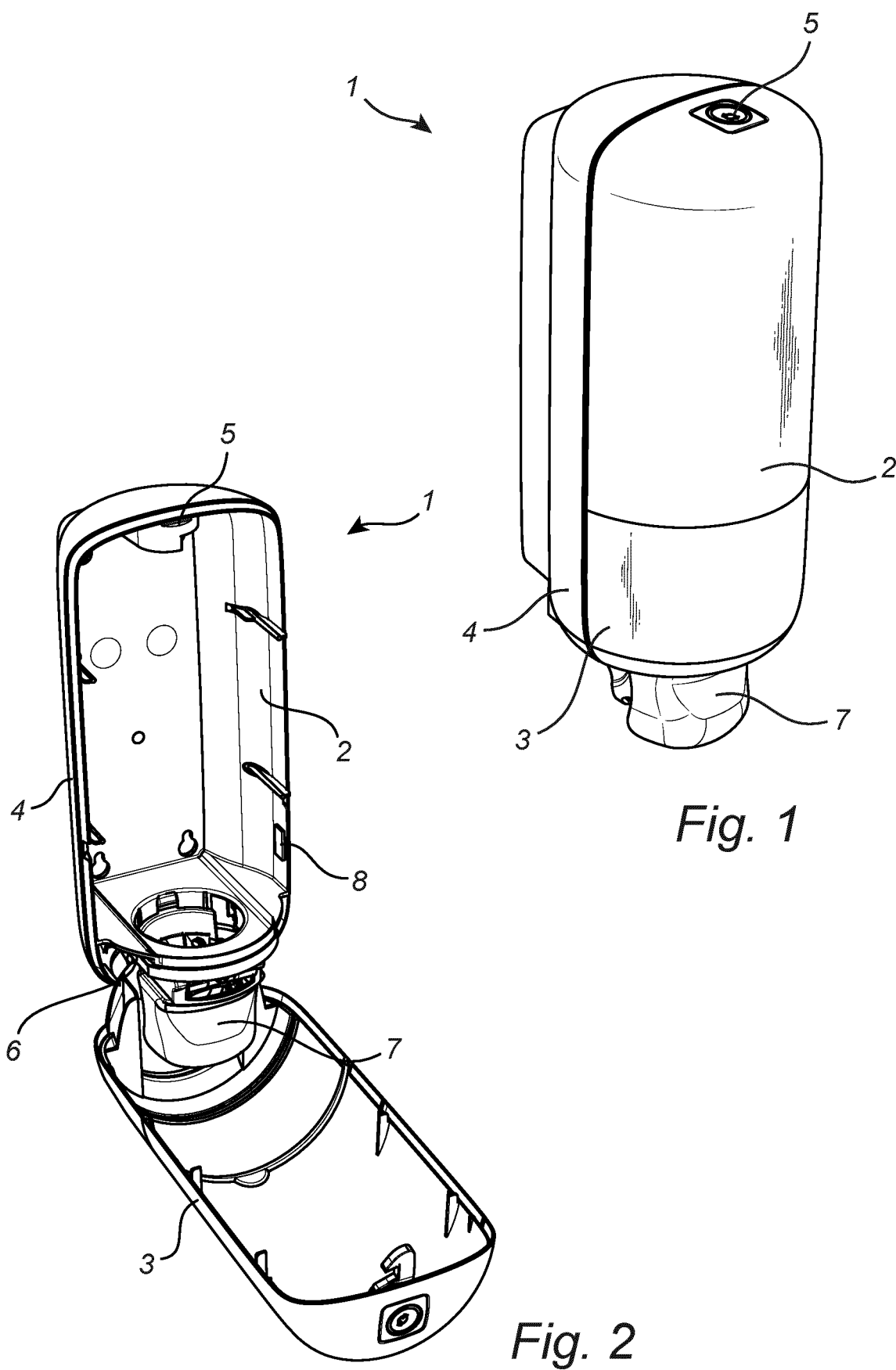
FIG. 1 shows a perspective view of a dispenser for liquids according to a first embodiment.
FIG. 2 shows a perspective view of the dispenser according to FIG. 1, in a condition in which a housing of the dispenser has been opened to allow access to the interior of the dispenser.

With initial reference to FIG. 1, there is shown a perspective view of a dispenser 1 for dispensing a liquid such as for example soap. The dispenser 1 can alternatively be used for other liquids such as a sanitizer, lotion, shampoo, skin care product, detergent, disinfectant, moisturizer, alcogel or a similar liquid, or alternatively fluids such as a dispersions (for example an aerosol). The dispenser 1 is arranged so that a liquid can be discharged in the form of a fluid, a gel, a foam, a spray or similar. Generally, the dispenser 1 is arranged for being placed in a location where the liquid is intended to be used, e.g. a bathroom, a hospital room or a kitchen.

According to an embodiment which is shown in the drawings, the dispenser 1 is used for dispensing soap which is processed so as to be discharged as foam. To this end, the dispenser 1 can be actuated by means of a foam pump unit which is not shown in FIGS. 1 and 2 but which will be described below.

The dispenser 1 shown in FIGS. 1 and 2 comprises a housing 2 which is configured for containing a replaceable liquid container (not visible in FIGS. 1 and 2), also referred to as a replaceable refill unit. The housing 2 comprises a first portion 3 and a second portion 4 which are coupled to each other by a hinge and which can be locked together by means of a lock 5. Other fastening means between the first portion 3 and the second portion 4 are also possible. The first portion 3 corresponds to a front side of the housing 2 whereas the second portion 4 corresponds to a rear side of the housing 2 and is furthermore arranged for mounting for example on a wall. The first portion 3 and the second portion 4 are suitably coupled to one another by a hinge along the bottom of the housing 2. This is clearly shown in FIG. 2, in which it can be seen that the first portion 3 is pivotally arranged in relation to the second portion 4 via a hinge mechanism 6 in the form of a pivot joint or a similar arrangement.

Other designs for opening the housing 2 are also possible within the scope of this disclosure. Furthermore, the housing 2 may be made of any suitable material, for example plastic or metal.

As mentioned initially, the dispenser 1 is provided with an actuation device 7. The embodiment shown in the drawings comprises an actuation device 7 in the form of a manual push button. A user who wishes to discharge an amount of soap will have to push the actuation device 7, which causes discharge of a liquid in a manner which will be described below.

According to an embodiment which is not shown in the drawings, the dispenser 1 can alternatively be provided with an automatic actuation device, which may comprise a touch-free sensor unit which may be based for example on an infrared sensor unit. Actuation of the sensor may then cause an electric motor to be activated in order to operate the dispenser upon detection of the presence of a user. Technology related to touch-free actuation sensor in the field of soap dispensers is previously known as such.

Furthermore, the dispenser 1 is of the type which is provided with a transponder reader unit 8, i.e. an antenna unit or transponder detection unit which is arranged for detecting and cooperating with a transponder unit on a liquid container. The transponder unit will be described below with reference to FIG. 3.

Figure 3:
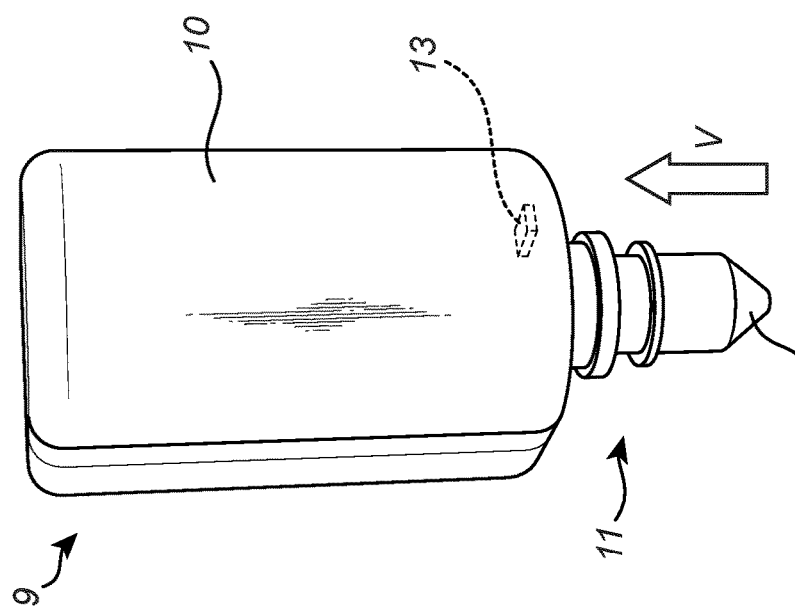
FIG. 3 shows a perspective view of a replaceable liquid container which is intended to be placed in the dispenser.

FIG. 3 shows a replaceable liquid container 9, also referred to as a "refill unit", which is intended to be used with the dispenser shown in FIGS. 1 and 2. The liquid container 9 is designed for storing and transporting liquid prior to use in the dispenser 1. The liquid container 9 is also designed to be inserted and fitted into the dispenser 1 for dispensing of the liquid. The liquid container 9 is designed to be used in dispensers of the type in which the dispensing takes place from the bottom of the dispenser. When the liquid container 9 is empty it may be removed and replaced with a new container.

As shown in FIG. 3, the liquid container 9 comprises a liquid reservoir 10 and a foam pump unit 11 which is connected to and ends with a dispensing opening 12. The liquid reservoir 10 is the portion of the liquid container 9 in which liquid is stored. In FIG. 3, the liquid reservoir 10 is shown as having a generally cylindrical form, but other three-dimensional forms are also possible. The reservoir 10 is consequently hollow, and is made of a material which is suitable for the liquid contained, without degradation of the liquid or the liquid reservoir 10. Suitable materials for the liquid reservoir 10 are plastics, for example polyethylene or polypropylene.

Furthermore, the liquid container 9 comprises a pump unit, which in the illustrated embodiment is in the form of a foam pump unit 11, which acts to transfer liquid from the liquid reservoir 10 and dispense it in the form of foam. To this end, the liquid reservoir 10 is connected to and in fluid communication with—via the foam pump unit 11—the dispensing opening 12 through which the foamed liquid is discharged. A foam pump unit 11 for a liquid dispenser of the kind mentioned above is previously known as such from the patent document WO 2011/133085. For this reason, the pump unit 11 is not described in any greater detail here.

However, it should be mentioned that activation of the foam pump unit 11 by displacing its lower portion upwards, i.e. in a first generally vertical direction (arrow V), discharges a quantity of liquid in the form of a foam from the liquid reservoir 10 via the dispensing opening 12. As illustrated in FIG. 3, the pump unit 11 is located at one end of the liquid reservoir 10, and the first, generally vertical direction (arrow V) corresponds to an extension of the longitudinal axis of the cylindrical liquid reservoir 10.

As mentioned above, the disclosure is based on a principle that the contents of the liquid container 9 can be in many forms, suitably but not limited to foam, spray, gel, lotion or similar. Different types of contents in the liquid container 9 and different methods of discharging said contents may require different types of pump units, which are adapted to the contents of the liquid container 9. This means that the disclosure is not limited to dispenser systems with a foam pump unit as described with reference to FIG. 3 but can be implemented with other types of pump units. In fact, an example of an alternative type of pump unit is disclosed in patent document WO 2017/050390.

Figure 4:
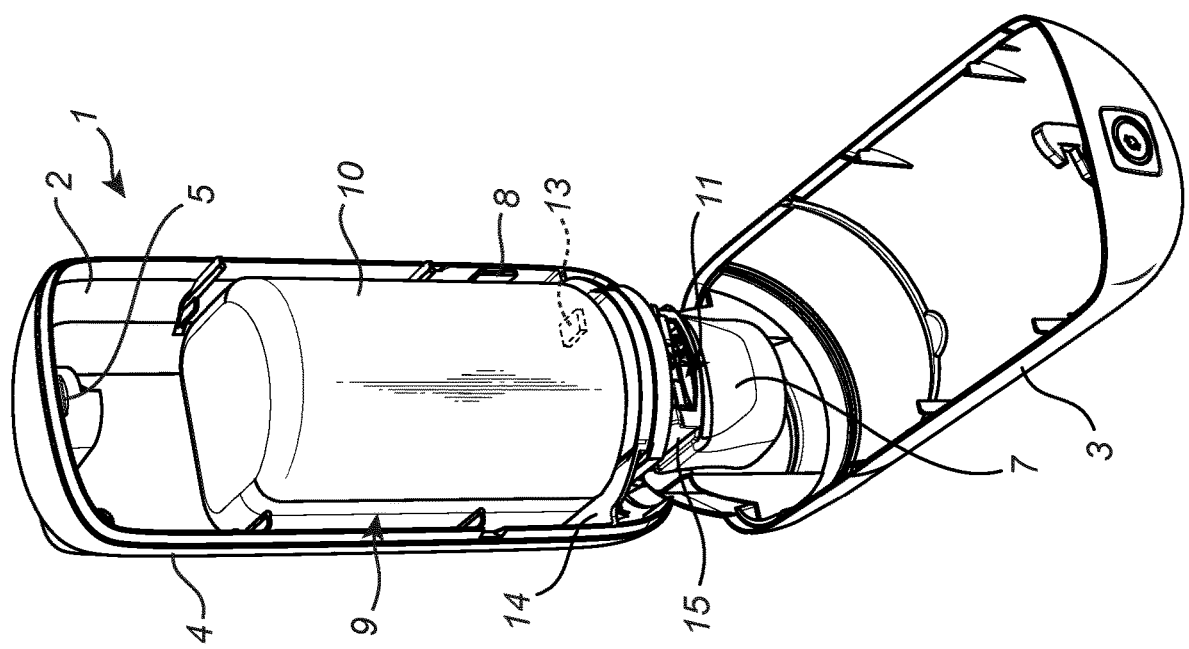
FIG. 4 shows a dispenser system with a dispenser, in a view corresponding to FIG. 2 but including a replaceable liquid container which is positioned in the dispenser.

FIG. 4 shows a dispenser system comprising the dispenser 1 and the liquid container 9, in an operating mode with the housing 2 in an open condition. When the first portion 3 of housing 2 is closed, the dispenser system is ready to be used. As shown, the dispenser 1 is provided with the replaceable liquid container 9, i.e. in a condition in which the container 9 is positioned inside the housing 2. In this condition, the liquid container 9 rests upon a bottom surface 14 in the housing 2 and is arranged so that the pump unit 11 extends downwards through an opening 15 in said bottom surface 14. Also, the pump unit 11 is positioned behind the actuation device 7 so that it may be activated mechanically by means of the actuation device 7 when a user wishes to dispense soap. More precisely, and with further reference to FIGS. 5A and 5B, which show a side view of the replaceable liquid container 9 with the actuation device 7 shown in cross-section, it should firstly be noted that the actuation device 7 is arranged in a pivotable manner with reference to a pivoting axis 16 arranged in the dispenser 1. Also, the actuation device 7 comprises an actuator surface 7a, which is configured so that a user may push on it, and a pump actuator 7b, which is configured so as be positioned below an annular flange 17 extending around the pump unit 11 when the actuation device 7 is in a stand-by condition.

Figure 5A:
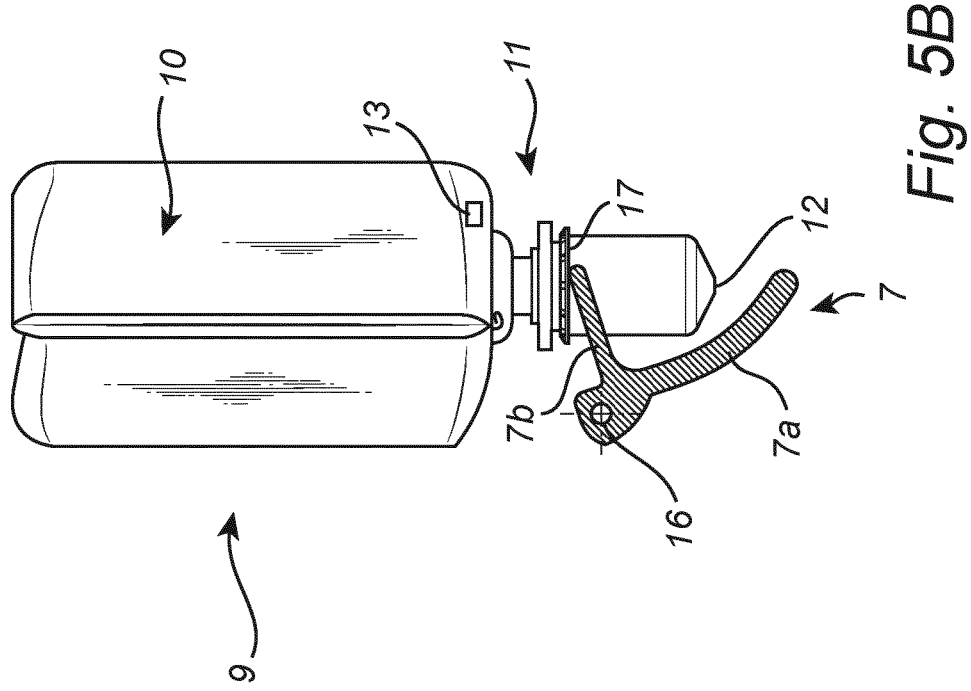
FIG. 5A shows a replaceable liquid container and the operation of an actuating unit, in a first condition.

In a first position, shown in FIG. 5A, the actuation device 7 is in a pivotal position in which it is accessible to a user. When the user pushes on the actuator surface 7a, the actuation device 7 will pivot in a counter-clockwise direction. This rotation makes the pump actuator 7b move so as to force the flange 17 in an upwards direction (i.e. arrow V in FIG. 5) so as to actuate the pump unit 11. In a second position, shown in FIG. 5B, the pump actuator 7b has reached a pivotal position in which the flange 17 has been forced to an upper position which corresponds to a condition in which foam has been pumped out via the dispensing opening 12.

Figure 5B:
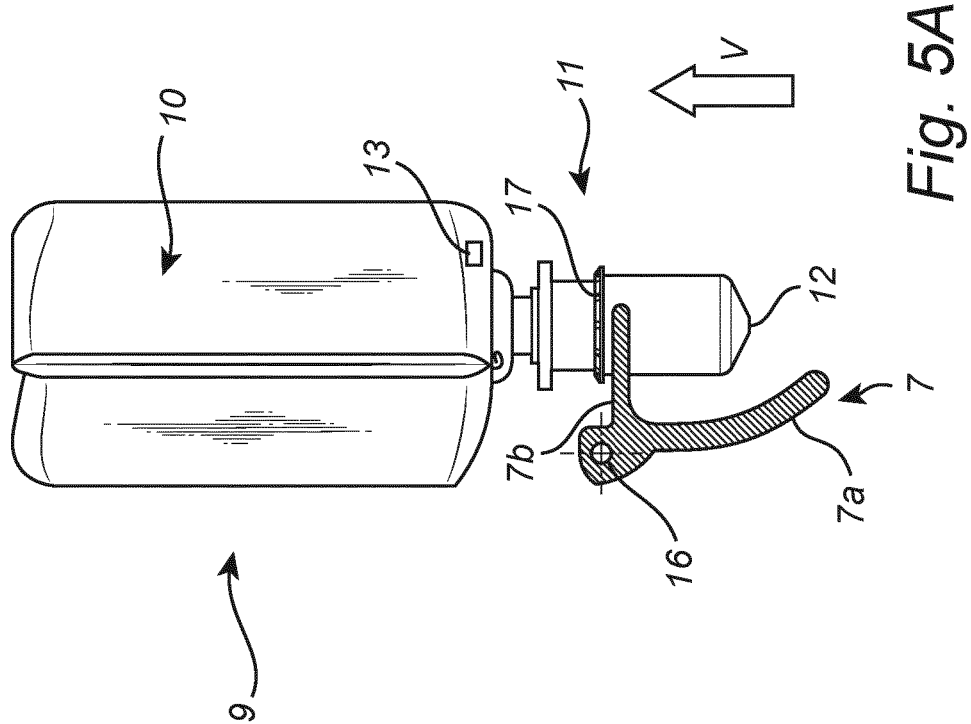
FIG. 5B shows a replaceable liquid container and the operation of an actuating unit, in a second condition.

It is previously known, for example through the above-mentioned document WO 2011/133085, how an actuation device as shown in for example FIGS. 5A and 5B can be operated to actuate a dispenser system.

The replaceable liquid container 9 is arranged with means for storing unique identification data related to said liquid container 9. As indicated in FIGS. 3, 4, 5A and 5B, the liquid container 9 is provided with an electronic transponder 13 which can be pre-programmed with data indicating a unique data code which corresponds to the identity of each individual container 9. In a specific embodiment, the transponder 13 is suitably positioned on or close to a bottom outer surface of the liquid container 9 (see for example FIG. 4). Alternatively, the transponder 13 can be embedded within the material from which the liquid reservoir 10 is formed. Also, it should be noted that the transponder 13 is drawn in a schematic manner, see for example FIG. 4, and that it should be positioned at an appropriate distance from the transponder reader unit 8 in order to cooperate with said transponder reader unit 8.

The term "transponder" refers to an electronic device which is configured for receiving a signal and for emitting a response signal in response to the incoming signal. A particular type of known transponder which is suitable in the context of this disclosure is a so-called RFID (radio frequency identification) transponder, also referred to as an RFID tag, which uses electromagnetic radiation to receive and process an incoming signal and to emit an outgoing signal. The RFID transponder is normally designed as a tag or a label comprising an antenna component which receives the incoming signal, and a processor component which processes the incoming signal and also transmits the outgoing signal via the antenna component.

According to what is previously known as such, an RFID transponder can be programmed with data representing the transponder's unique identity. Accordingly, the RFID transponder 13 shown in the drawings is programmed with data indicating the identity of a corresponding liquid container 9 to which the RFID transponder 13 is attached. This means that already during manufacturing of each liquid container 9, its unique identity is stored on the attached RFID transponder 13.

An RFID transponder can be either passive (i.e. without any power source) and active (i.e. comprising a power source). Also, in addition to data representing the actual identity of a given liquid container, the RFID transponder 13 can be programmed with data representing for example the type of liquid stored in the liquid container 9 and the total amount of liquid stored in the liquid container 9. Also, the RFID transponder 13 may comprise data representing the date of manufacturing of the liquid container 9, or a suitable size of a soap dose which can be dispensed, or other types of data related to the liquid container and/or its contents.

According to other contemplated examples, the transponder can alternatively be of other types, such as for example an optically readable barcode or a tag or label based on for example Bluetooth® technology.

Figure 6:
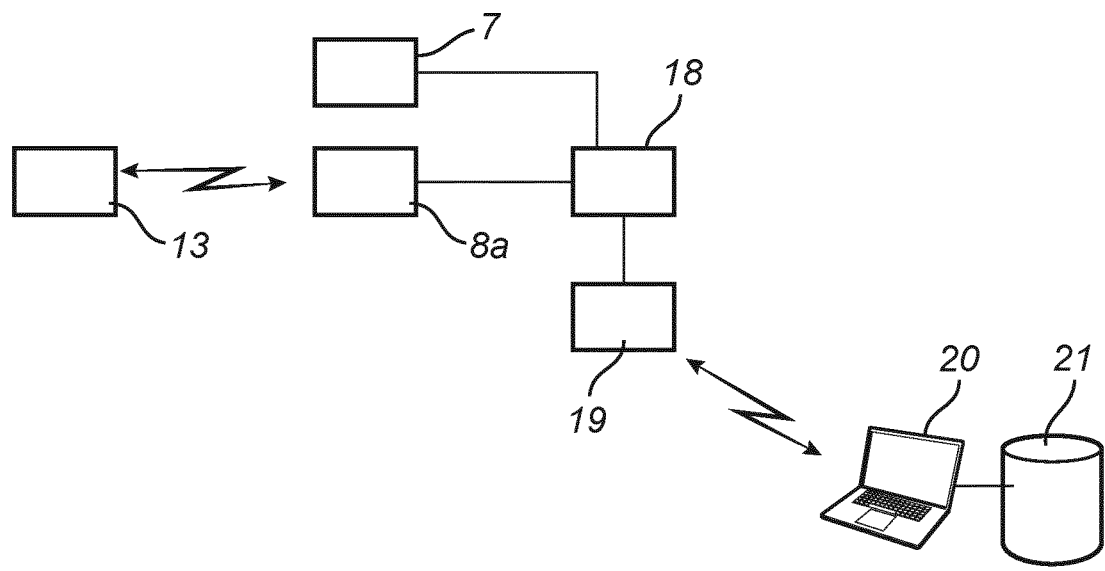
FIG. 6 is a schematic drawing of a system for detection of the consumption of the liquid container.

Furthermore, data associated with the transponder 13 can be detected and read by means of the transponder reader unit 8 which is shown in FIGS. 2 and 4. To this end, the transponder reader unit 8 is arranged for transmitting an interrogation signal to the transponder 13. Such an interrogation signal can for example be issued in order to request data from the transponder 13 representing the identity or type of liquid in the liquid container 9. A response signal from the transponder 13 is then received and stored by means of the transponder reader unit 8. With reference to FIG. 6, there is shown in a simplified manner a schematic drawing of a system for transmitting data to and from the dispenser 1. The system is based on a microprocessor 18 which is operatively connected to the transponder reader unit 8 and also to the actuation device 7. For this purpose, the actuation device 7 is provided with an electrical switch or detector (not shown) which is configured for generating an activation signal and transmitting said activation signal to the microprocessor 18 each time a user actuates the dispenser 1 by pushing on the actuation device 7.

An interrogation signal from the microprocessor 18 to the transponder 13 is suitably transmitted from the transponder reader unit 8 when a user pushes on the actuation device 7. The signal is transmitted to the transponder 13, which in turn generates a response signal including data which represents the actual identity of the transponder 13. This response signal is forwarded to the microprocessor 18. This can be carried out at a specific point in time or repeatedly at a certain frequency, or when the actuation device 7 transmits an activation signal indicating that dispensing has been initiated.

The information which has been collected by the microprocessor 18 can subsequently be forwarded to a communications unit 19 which is configured for transmitting data to an external computer unit 20 which is configured for treatment of the incoming data. According to an embodiment, the communications unit 19 comprises a radio transceiver which is arranged for providing two-way radio communication with the external computer unit 20. A computer memory unit 21 such as a database is suitably operatively connected to the external computer unit 20.

In one embodiment, the RFID transponder 13 only contains information regarding the unique identity of a liquid container 9. During an interrogation situation, data related to the identity of the liquid container 9 is transmitted to the external computer 20, which is arranged to fetch relevant data regarding the liquid container 9 and its contents from the database 21. Such relevant data may comprise information regarding the identity of liquid container 9 and the accumulated amount of travel of the pump unit 11. Based on such relevant data, information regarding for example a suitable time to replace the liquid container 9 can be forwarded to cleaning staff.

Consequently, the external computer unit 20 may send information to cleaning staff related to the liquid level within liquid container 9, or alternatively whether the recommended latest date for use of a particular liquid container 9 has expired, or whether a liquid container 9 needs to be replaced due, for example, to a particular quality characteristic.

In summary, the above-mentioned dispenser 1 is arranged for housing the replaceable liquid container 9, which is provided with a unique identity and which also carries a transponder unit 13 with stored identification data representing the identity of the liquid container 9. Also, the dispenser 1 comprises a transponder reader unit 8 for cooperating with the transponder unit 13 and which is also configured for communicating with an external computer unit 20. Also, the dispenser 1 is arranged for detecting the accumulated usage of the liquid container 9 so as to indicate whether the liquid container 9 needs to be replaced.

Figure 7:
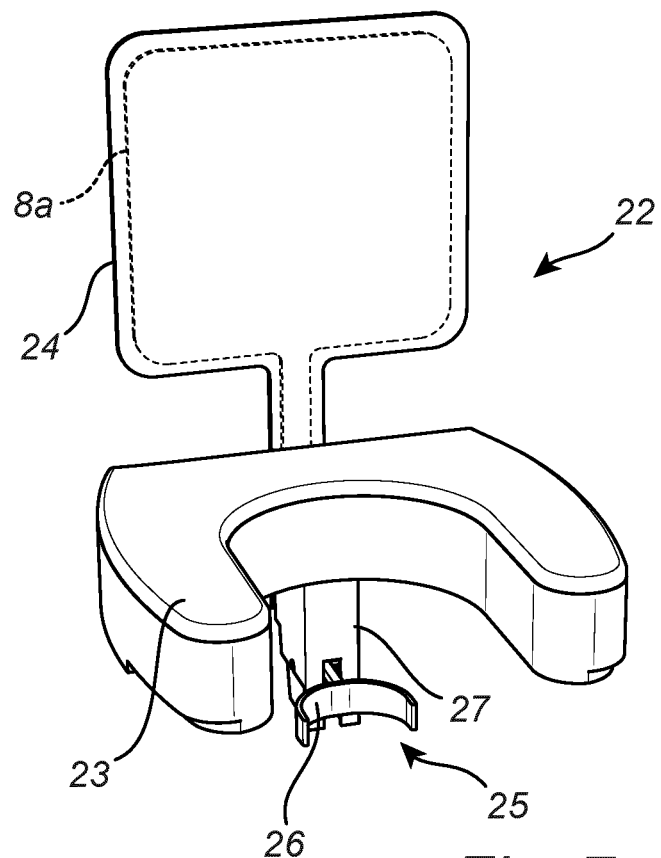
FIG. 7 shows an insert module in accordance with the disclosure.
Figure 8:
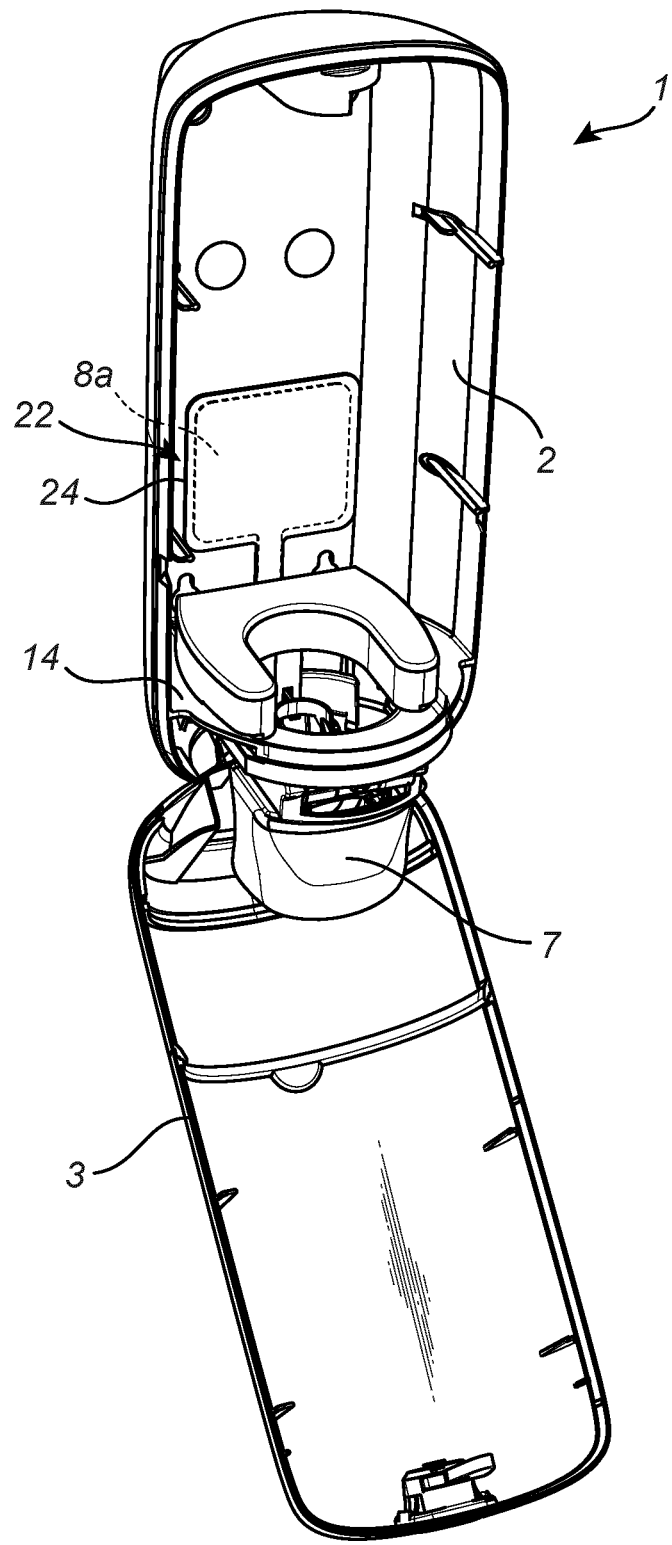
FIG. 8 shows a view of a dispenser and including the insert module of FIG. 7 which is mounted in the housing.

With reference to FIGS. 7 and 8, the dispenser system in that illustrated embodiment comprises a removeable insert module 22. The term "insert module" is used to describe a unit which can be positioned inside the housing 2 in a releasable manner, i.e. temporarily or more permanently, i.e. for a relatively long time. Consequently, the insert module 22 may or may not form part of the dispenser system. The insert module 22 is shown separately in FIG. 7 and is shown in a condition in which it is positioned inside the housing 2 of the dispenser 1 in FIG. 8. In one embodiment, the purpose of such an arrangement is to use the insert module 22 to accommodate a replaceable liquid container 9 during operation of the dispenser system. More precisely, the insert module 22 is first positioned in the housing 2, after which the liquid container 9 is positioned in the insert module 22. In the embodiment shown in the figures, the insert module 22 is designed with a base portion 23 which is generally U-shaped and used for accommodating a liquid container 9, and a rear portion 24 which is positioned to be placed behind the replaceable liquid container 9 during use of the dispenser 1.

Furthermore, the insert module 22 is provided with a transponder reader unit 8a which is arranged for cooperating with a transponder unit 13 carried by the liquid container 9, in a similar manner as described above with reference to transponder reader unit 8 shown in FIGS. 2, 3 and 4. In the embodiment shown in FIG. 7, the transponder reader unit 8a is positioned in the rear portion 24 of the insert module 22.

This means that the insert module 22 can be used for a dispenser system which is not provided with any transponder reader unit and where there is a need for detecting a transponder unit 13 on the liquid container 9. In other words, a dispenser 1 which has not been manufactured with any transponder reader unit can be retrofitted with an insert module 22 (with the built-in transponder reader unit 8a) as shown in FIGS. 6 and 7.

Such a dispenser 1 can then be used with a liquid container 9 having a transponder unit 13.

It should be noted that the dispenser system is configured to be operated either with the insert module 22 or without the insert module 22. The first case is suitable if the dispenser 1 is not provided with any transponder reader unit. This can be relevant for example as regards alternative dispenser types which were not originally manufactured with the intent to be used with a liquid container having a transponder unit.

Furthermore, it should be noted that, in a specific embodiment, the insert module 22 may alternatively be arranged without any transponder reader unit. Such an insert module 22 may be suitable in those cases in which the dispenser 1 itself already has a transponder reader unit 8, as shown in FIG. 2.

Consequently, the dispenser system as a whole comprises a transponder reader unit, either positioned in the housing or in the insert module (in case such an insert module is used). This means that the dispenser system can be operated either with or without the insert module shown in FIG. 7.

The fact that the dispenser system comprises a transponder reader unit 8, 8a for detecting a transponder 13 should consequently be construed as meaning that either the insert module 22 or the dispenser 1 as such (i.e. suitably within the housing 2) is equipped with such a transponder reader unit 8, 8a.

In the embodiment shown in FIGS. 7 and 8, the insert module 22 is furthermore provided with a detection unit 25 which is arranged for detecting the cumulative consumption of the contents of the replaceable liquid container 9. This is suitably implemented by detecting the operation of the pump unit 11. More precisely, the detection unit 25 is based on a generally C-shaped actuator 26 which is pivotally arranged in a bottom portion 27 of the insert module 22 and which is arranged to follow the movement of the flange 17 of the pump unit 11 shown in FIGS. 5A and 5B. This is facilitated by the C-shaped actuator 26 being configured for positioning around the circumference of the pump unit 11 and will be forced in a vertical direction through movement of the flange 17. As will be described in greater detail below with reference to FIG. 9, the C-shaped actuator 26 can be used for detecting usage of the pump unit 11 and to transmit information regarding such usage to a microprocessor.

FIG. 8 shows the dispenser 1 with the insert module 22 mounted in the housing 2, i.e so that the base portion 23 of the insert module 22 rests upon the bottom surface 14 of the housing 2 and so that the bottom portion 27 extends through the opening 15 in the bottom surface 14.

Figure 9:
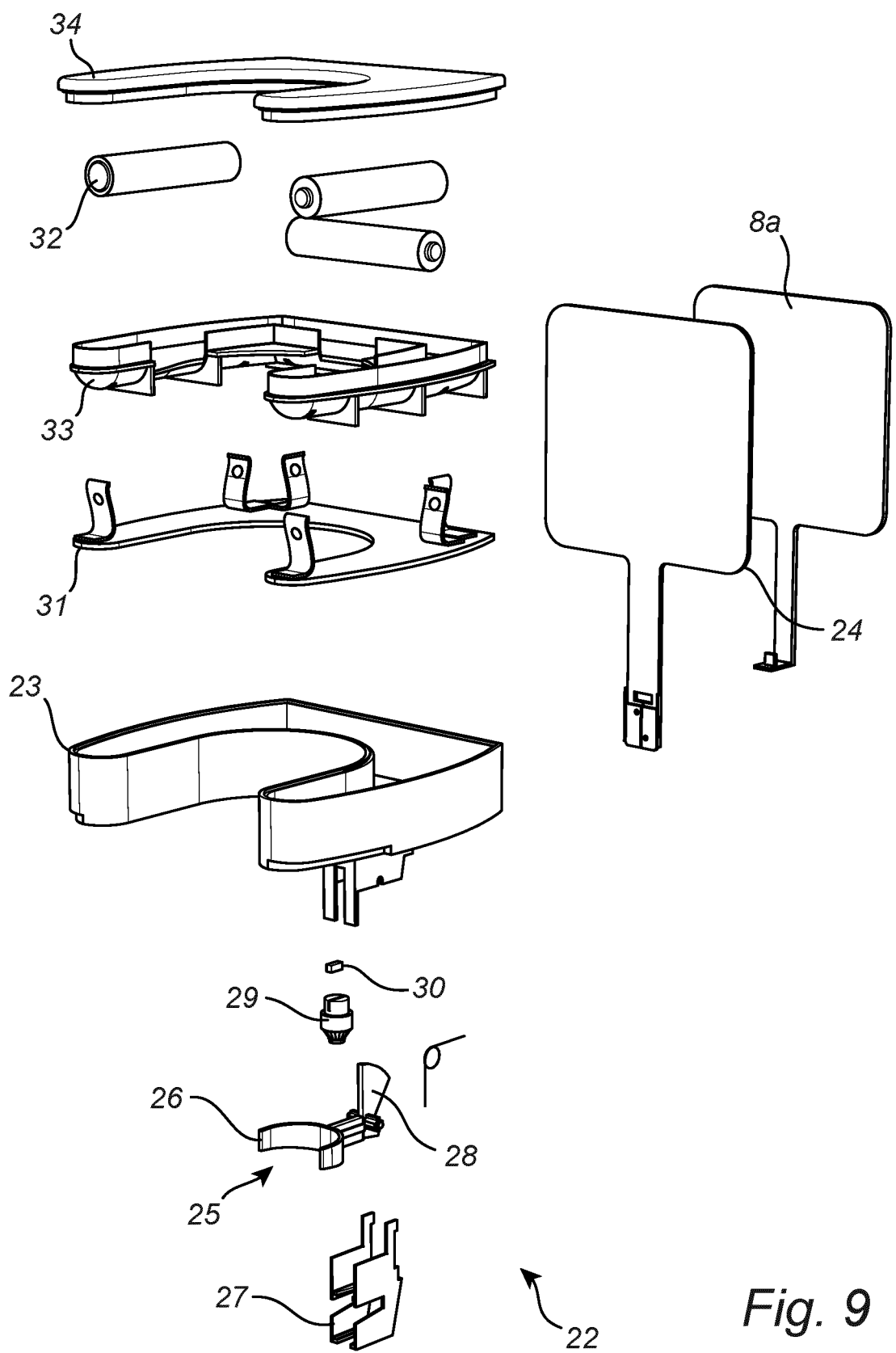
FIG. 9 shows the insert module from another angle, which in particular shows a detection device.

FIG. 9 shows the insert module 22 in greater detail. As mentioned above, the insert module comprises a base portion 23 and a rear portion 24. The transponder reader unit 8a is integrated in the rear portion 24. Furthermore, the detection unit 25 is in the form of the generally C-shaped actuator 26 which is pivotally hinged in the bottom portion 27 which in turn is attached to the base portion 23.

In the example embodiment of FIG. 9, the detection unit 25 has a gear portion 28 which meshes with a rotating gear element, which according to the embodiment is constituted by a gear wheel 29 which is arranged in the base portion 23 in a manner so that it may rotate about an axis which is generally vertically arranged. Furthermore, any pivoting motion of the C-shaped actuator 26—which is caused by actuation of the pump unit 11—will act so that the gear portion 28 forces the gear wheel 29 to rotate in a direction which corresponds to the direction of pivotal movement of the actuator 26.

The gear wheel 29 is arranged so as to cooperate with a suitable sensor, for example a Hall sensor, which is a previously known type of magnetometer sensor based on a magnetic sensor which senses the presence of a magnetic field as generated by a permanent magnet 30.

According to an embodiment, the sensor comprises a 2-dimensional or 3-dimensional Hall effect sensor that measures the orthogonal magnetic fields in the rotational plane of the magnet. When the magnet rotates during the actuation of the dispenser, the ratio of magnetic field strength among the measured dimensions changes and this ratio is used to determine the rotation angle of the magnet.

The magnetic sensor is not shown as such in FIG. 9 but is suitably arranged as a separate unit in the insert module 22, for example in a printed circuit board 31 which is positioned in the base portion 23. Furthermore, the insert module 22 comprises a compartment for power source, which in this particular embodiment is in the form of a number of batteries 32, which are enclosed by means of a lower section 33 and an upper section 34. The lower section 33 covers the printed circuit board 31.

Consequently, the magnetic sensor is positioned on the printed circuit board 31 which is enclosed within a compartment (defined by the base portion 23 and the lower section 33) which suitably is arranged in a waterproof manner, whereas the magnet 30 is arranged outside said waterproof compartment.

The actuation device 7 shown for example in FIGS. 5A, 5B and 8 is displaced directly by a user by means of a pushing motion. Consequently, the actuation device 7 translates a displacement effected by the user into a movement of the detection unit 25 which corresponds to the displacement of the pump unit 11 and also to the amount of liquid which has been dispensed. It should be mentioned that the actuation device 7 (see FIGS. 5A and 5B) is indirectly connected to the detection unit 25. More precisely, the movement of the actuation device 7 causes the flange 17 of the pump unit 11 to be displaced. This movement in turn causes the C-shaped actuator 26 to pivot as described above. Consequently, the actuation device 7 and the detection unit 25 interact through this indirect connection.

This means that the detection unit 25 can be used for measuring the actual cumulative amount of liquid that has been dispensed from the liquid container 9. Such information is suitably combined with information regarding the points in time at which dispensing has occurred, i.e. when a user has pushed on the actuation device 7.

Figure 10:
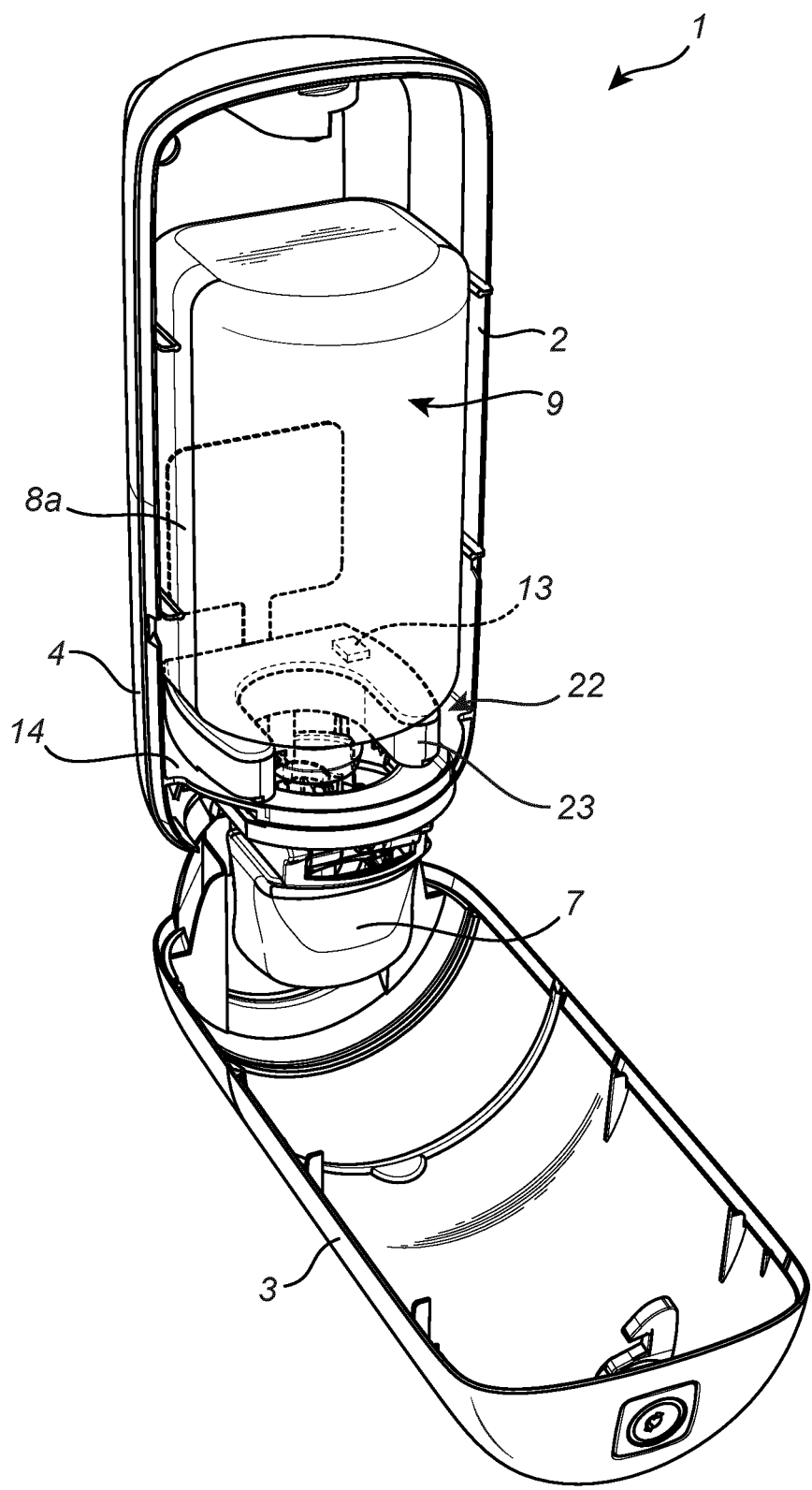
FIG. 10 shows a view corresponding to FIG. 8 with a dispenser system but including a replaceable liquid container which is mounted in and supported by the insert module.

FIG. 10 shows an embodiment of a dispenser system in which the insert module 22 is positioned in the housing 2. Next, the replaceable liquid container 9 is positioned in the insert module 22 in a manner so that the pump unit 11 extends through the U-shaped space defined by the base portion 23. Also, the pump unit 11 is positioned so that the C-shaped actuator 26 of the detection unit 25 is positioned around a part of the circumference of the pump unit 11. This means that when a user pushes on the actuator 7, the pump unit 11 will be displaced as described with reference to FIGS. 5A and 5B, i.e. so that the flange 17 is forced upwards. This also means that the C-shaped actuator 26 is pivoted upwards. By means of the gear portion 28 of the actuator 26 which meshes with the gear wheel (see FIG. 9), detection of the movement of the pump unit 11 can be obtained.

The displacement of the pump unit 11 as actuated by users of the dispenser 1 is detected by the detection unit 25. By means of information regarding the liquid container 9, for example regarding the pump type and the type of liquid in the container 9, which has been obtained by reading the transponder unit 13, the cumulative (total) number of displacement events of the pump unit 11 can be translated into a precise measurement of the consumption of the liquid container 9. This translation can be carried out through the use of previously stored information regarding a nominal amount of liquid which is dispensed for each actuation of the dispenser or which amount of liquid corresponds to a given displacement of the pump unit 11.

Figure 11:
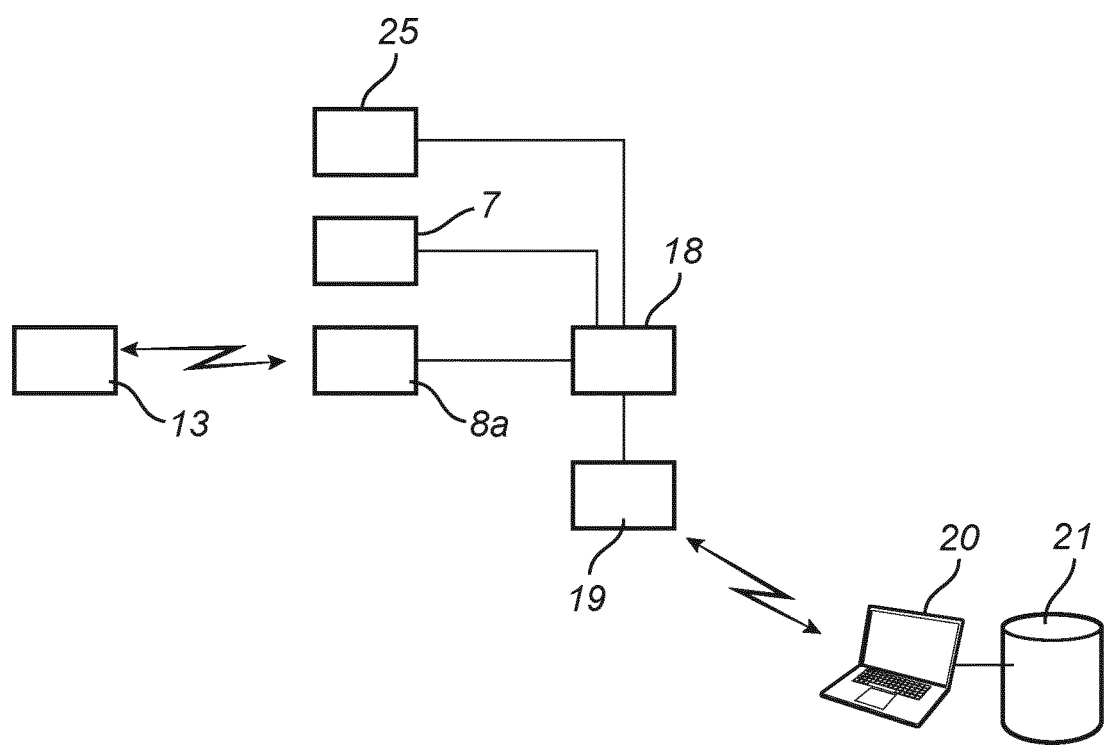
FIG. 11 is a schematic drawing of a system for detection of the consumption of the liquid container according to a further embodiment.

FIG. 11 a schematic representation of the dispenser system of FIG. 10. More precisely, the system is based on the transponder unit 13 which can be detected by means of the transponder reader unit 8*a*, which is operatively connected to a microprocessor 18. Also, the actuation unit 7 is connected to the microprocessor 18 in generally the same manner as described with reference to FIG. 6, i.e. so that a signal is generated and transmitted to the microprocessor 18 when a user activates the dispenser 1.

Furthermore, the detection unit 25 is also operatively connected to the microprocessor 18. In this manner, a signal corresponding to the usage, i.e. the cumulative amount of soap dispensed from the liquid container 9, can be generated when the actuation device 7 is activated by a number of users. Data regarding such usage can be transmitted to the microprocessor 18. This means that the cumulative amount of soap which has been dispensed can be calculated by means of the microprocessor 18. Data related to the usage of soap can furthermore be transmitted from the microprocessor 18 and to an external computer unit 20 via a communications unit 19.

By means of the system as described above, a number of processes for detecting and tracking usage of the dispenser 1 can be implemented. Firstly, the external computer unit 20 can be configured for calculating the cumulative usage of liquid in each liquid container 9 with which external computer unit 20 communicates. The external computer unit 20, in turn, can be configured for sending alert messages and instructions to maintenance staff when it has detected that a particular replaceable liquid container 9 is empty or close to empty.

The calculation of the cumulative usage of liquid from a particular dispenser may depend on information related to the volume of liquid in the particular liquid container in that dispenser and/or on the type of liquid being dispensed from the particular liquid container. Such information can be stored in the transponder unit 13. In general terms, the transponder unit 13 can be used to store information about each liquid container 9, as regards for example its manufacturing date, ingredients, shelf life, usage, waste instructions and more.

The detection unit 25 is based on a magnetometer sensor which provides a highly accurate measurement of the movement of the actuator 26, which in turn provides an accurate measurement of the liquid used.

Furthermore, data from a large number of liquid containers can be used for collecting statistics regarding the use of the dispensers, for example for determining whether certain dispensers are used more frequently than others and for determining the overall consumption of liquid at a particular site, such as a hospital or airport. Also, the average use of liquid for each dispenser which is connected to the external computer unit 20 can be determined.

Also, information regarding the usage of liquid can be combined with other information which can be programmed on the transponder unit 13, for example which type of liquid is in the liquid container 9. This means that statistics regarding the usage of different types of liquids can be obtained as well.

Furthermore, the dispenser 1 can be configured for recognizing whether the liquid container 9 is of a particular brand, by checking (by means of the external computer unit 20 and the memory unit 21) whether the identity of the liquid container 9 is included in a pre-stored database of approved liquid containers.

Also, the dispenser can be configured for recognizing whether the liquid container 9 is a full, unused liquid container by checking, in the external computer unit 20, whether the identity of the liquid container corresponds to a unit which has not been used before.

Furthermore, the dispenser can be configured for displaying information related to the contents of an individual liquid container e.g., type of fluid, volume, suitably on a display which is provided on the dispenser (not shown in the drawings).

Also, the information which is transmitted from the dispenser could comprise time stamp information, i.e. information on when a dispenser has been activated by a user. This means that information regarding when the liquid container needs to be replaced could be calculated both depending on cumulative usage data and also depending on the intensity of the user traffic associated with the dispenser.

The disclosure is not limited to the embodiments described above but can be varied within the scope of the appended claims.

Although the described embodiments relate to a liquid container 9 which contains soap, it should be noted that other liquids are contemplated for use with the dispenser and dispensing systems described above. For example, and without limitation, it is contemplated that a liquid container 9 may contain a detergent, a disinfectant, a skin-care solution, a moisturizer, a sanitizer, a lotion, shampoo, or a medicaments. The choice and composition of the liquid can be varied by the skilled person depending on the properties needed for the liquid and the desired result.

Furthermore, it should be noted that the detection unit 25 can be arranged both in the insert module 22, as described above with reference to FIGS. 8 and 9, or alternatively in other parts of the dispenser 1 (not shown in the drawings).

Also, the actuating device can be a manually operated device or a motorized device. In the embodiment of FIG. 4, the actuating device is of the manual type and therefore intended to be manually operated by a user. In other embodiments, the actuating device may be motorized, which means that an electric motor is activated so as to operate the foam pump unit when a user pushes on the actuating device. Alternatively, the actuating device may be an automatic type i.e., one that is based on a touch-free sensor, for example based on infrared technology, which senses the presence of a user and activates an electric motor when a user has been detected.

The invention claimed is:

1. A dispenser system comprising:
a dispenser;
an insert module removably disposed on the dispenser;
a replaceable liquid container; and
a pump unit,
wherein said liquid container has a unique identity and is provided with a transponder unit with stored identification data representing said identity,
wherein a transponder reader unit configured to cooperate with said transponder unit is located within the dispenser,
wherein the transponder reader unit is configured to communicate with an external computer unit,
wherein the insert module comprises a detector comprising an actuator configured to follow a movement of a portion of the pump unit, the detector being configured to measure movement of the actuator to detect a usage of said liquid container so as to indicate whether said liquid container needs to be replaced,
wherein the insert module is configured to accommodate the liquid container,
wherein the dispenser is operable with and without the insert module, and
wherein the insert module is configured to accommodate the liquid container during operation of said dispenser with said insert module.

2. The dispenser system according to claim 1, wherein the insert module comprises the transponder reader unit configured to cooperate with said transponder unit.

3. The dispenser system according to claim 1, wherein the dispenser comprises the transponder reader unit configured to cooperate with said transponder unit.

4. The dispenser system according to claim 1, wherein the detector is configured to detect a cumulative consumption of a content of said replaceable liquid container.

5. The dispenser system according to claim 4, wherein the detection unit comprises a magnetometer sensor.

6. The dispenser system according to claim 5, wherein the actuator is configured to be pivotally displaced through movement of the pump unit, thereby allowing detection of a usage of the content of the liquid container.

7. The dispenser system according to claim 6, wherein the actuator comprises a geared element which meshes with a rotating gear element which is arranged in said insert module.

8. The dispenser system according to claim 1, wherein said transponder unit is an RFID tag and the transponder reader unit is an RFID reader unit.

9. The dispenser system according to claim 1, wherein the pump unit is integrated within said liquid container and is configured so that activation of said pump unit in a first direction (V) discharges a quantity of liquid from a liquid reservoir.

10. The dispenser system according to claim 9, wherein the pump unit is arranged to be displaced in said first direction (V) by actuating an annular flange.

11. The dispenser system according to claim 10, wherein said annular flange is arranged to be actuated by an actuation device which is accessible to a user.

12. A dispenser system configured to detect a usage of a replaceable liquid container that includes a transponder unit, the dispenser system comprising:
a dispenser;
an insert module;
a transponder reader unit configured to cooperate with the transponder unit of the replaceable liquid container,
wherein said transponder reader unit is located within the dispenser,
wherein the transponder reader unit is configured to communicate with an external computer unit,
wherein said insert module is removably arranged in said dispenser and configured to accommodate the liquid container,
wherein the dispenser is operable with and without the insert module,
wherein the insert module is configured to accommodate the liquid container during operation of said dispenser with said insert module, and
wherein the insert module comprises a detector comprising an actuator configured to follow a movement of a portion of a pump unit, the detector being configured to measure movement of the actuator to detect a usage of the replaceable liquid container so as to indicate whether to replace the replaceable liquid container.

13. A method for dispensing liquid in a dispenser system comprising a dispenser and a replaceable liquid container, said method comprising:
  providing said liquid container with a unique identity by a transponder unit having stored identification data representing said identity;
  providing a transponder reader unit in said dispenser;
  providing cooperation between said transponder reader unit and said transponder unit;
  providing communication between said transponder reader unit and an external computer unit;
  configuring said dispenser system to detect a usage of said liquid container so as to indicate whether said liquid container needs to be replaced;
  configuring an insert module so as to be removably arranged in said dispenser;
  configuring said insert module configured to accommodate the liquid container;
  configuring the dispenser is operable with and without the insert module;
  configuring the insert module to accommodate the liquid container during operation of said dispenser with said insert module; and
  configuring the insert module to comprise a detector comprising an actuator configured to follow a movement of a portion of a pump unit, the detector being configured to measure movement of the actuator to detect a usage of the replaceable liquid container so as to indicate whether to replace the replaceable liquid container.

14. The method according to claim 13, further comprising:
  detecting, via the detector, a cumulative consumption of a content of said replaceable liquid container.

* * * * *